US012335166B2

(12) United States Patent
Ng et al.

(10) Patent No.: US 12,335,166 B2
(45) Date of Patent: Jun. 17, 2025

(54) METHOD FOR CONTROLLING DOWNLOAD SPEED OF NORMAL TRAFFIC IN THE PRESENCE OF HIGH-PRIORITY TRAFFIC AND ASSOCIATED NETWORK DEVICE

(71) Applicant: MEDIATEK INC., Hsin-Chu (TW)

(72) Inventors: I-Hei Ng, Hsinchu (TW); Wei-Lun Liu, Hsinchu (TW); Kun-Cheng Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 382 days.

(21) Appl. No.: 17/883,574

(22) Filed: Aug. 8, 2022

(65) Prior Publication Data

US 2024/0048507 A1    Feb. 8, 2024

(51) Int. Cl.
*H04L 47/6295* (2022.01)
*H04L 47/24* (2022.01)
*H04L 47/25* (2022.01)
*H04L 47/80* (2022.01)

(52) U.S. Cl.
CPC ............ *H04L 47/805* (2013.01); *H04L 47/24* (2013.01); *H04L 47/25* (2013.01)

(58) Field of Classification Search
None
See application file for complete search history.

(56) References Cited

U.S. PATENT DOCUMENTS

| 10,455,013 | B2 | 10/2019 | Liu | |
|---|---|---|---|---|
| 2007/0189169 | A1 | 8/2007 | Wu | |
| 2011/0277009 | A1 | 11/2011 | Damola | |
| 2016/0344648 | A1 | 11/2016 | Szymanski | |
| 2017/0366467 | A1* | 12/2017 | Martin | H04L 12/4625 |
| 2020/0100143 | A1* | 3/2020 | Mena | H04L 47/2416 |
| 2020/0112514 | A1* | 4/2020 | Fraser | H04L 47/225 |
| 2021/0092035 | A1* | 3/2021 | Williams | H04L 47/22 |
| 2022/0247808 | A1* | 8/2022 | Hwang | H04L 65/612 |

FOREIGN PATENT DOCUMENTS

| CN | 101997891 A | 3/2011 |
|---|---|---|
| WO | 2015/096680 A1 | 7/2015 |

* cited by examiner

*Primary Examiner* — Minh Trang T Nguyen
(74) *Attorney, Agent, or Firm* — Winston Hsu

(57) ABSTRACT

A downlink bandwidth control method is applicable to a network device including a first queue for first traffic and a second queue for second traffic, and includes: determining whether traffic the network device is receiving meets a predetermined criterion associated with the first traffic; acquiring a total downlink bandwidth between the network device and another network device; and in response to determining that the traffic the network device is receiving meets the predetermined criterion associated with the first traffic, setting an upper bound of a download speed of the second traffic to a decreased value according to the total downlink bandwidth, wherein the decreased value is equal to a portion of the total downlink bandwidth.

20 Claims, 8 Drawing Sheets

METHOD FOR CONTROLLING DOWNLOAD SPEED OF NORMAL TRAFFIC IN THE PRESENCE OF HIGH-PRIORITY TRAFFIC AND ASSOCIATED NETWORK DEVICE

BACKGROUND

The present invention relates to managing a downlink bandwidth, and more particularly, to a method for controlling a download speed of normal traffic in the presence of high-priority traffic and an associated network device.

In a typical network system, a home router may communicate with a wide area network (WAN) router, a plurality of clients may communicate with the home router, and a plurality of servers may communicate with the WAN router. Regarding downlink transmission from the servers to the clients, the downlink traffic from the WAN router to the home router may include high-priority traffic (e.g. low-delay traffic) and/or normal traffic (e.g. background bulk traffic). The WAN router may have a WAN router queue shared for buffering packets of high-priority traffic output from a high-priority traffic sender and packets of normal traffic output from a normal traffic sender. The downlink channel from the WAN router and the home router has a limited downlink bandwidth. When the high-priority traffic sender and the normal traffic sender are both sending data to the WAN router queue and a sum of download speeds of the high-priority traffic sender and the normal traffic sender is larger than the downlink bandwidth between the WAN router and the home router, the WAN router may suffer from the bufferbloat issue. In addition, when the high-priority traffic sender and the normal traffic sender are both sending data to the WAN router queue, the WAN router queueing delay (packet processing time) may result in increased latency of the downlink traffic (particularly, high-priority traffic). Specifically, the more data the WAN router needs to process, the more latency the WAN router introduces to the downlink traffic (particularly, high-priority traffic). As a result, the high-priority traffic latency may fail to meet the requirements of low-latency applications such as streaming applications and game applications.

SUMMARY

One of the objectives of the claimed invention is to provide a method for controlling a download speed of normal traffic in the presence of high-priority traffic and an associated network device.

According to a first aspect of the present invention, an exemplary downlink bandwidth control method is disclosed. The exemplary downlink bandwidth control method is applicable to a network device including a first queue for first traffic and a second queue for second traffic, and includes: determining whether traffic the network device is receiving meets a predetermined criterion associated with the first traffic; acquiring a total downlink bandwidth between the network device and another network device; and in response to determining that the traffic the network device is receiving meets the predetermined criterion associated with the first traffic, setting an upper bound of a download speed of the second traffic to a decreased value according to the total downlink bandwidth, wherein the decreased value is equal to a portion of the total downlink bandwidth.

According to a second aspect of the present invention, an exemplary network device is disclosed. The exemplary network device includes a first queue, a second queue, and a downlink bandwidth control circuit. The first queue is arranged to buffer packets of first traffic. The second queue is arranged to buffer packets of second traffic. The downlink bandwidth control circuit is arranged to: determine whether traffic the network device is receiving meets a predetermined criterion associated with the first traffic; acquire a total downlink bandwidth between the network device and another network device; and when determining that the traffic the network device is receiving meets the predetermined criterion associated with the first traffic, set an upper bound of a download speed of the second traffic to a decreased value according to the total downlink bandwidth, wherein the decreased value is equal to a portion of the total downlink bandwidth.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
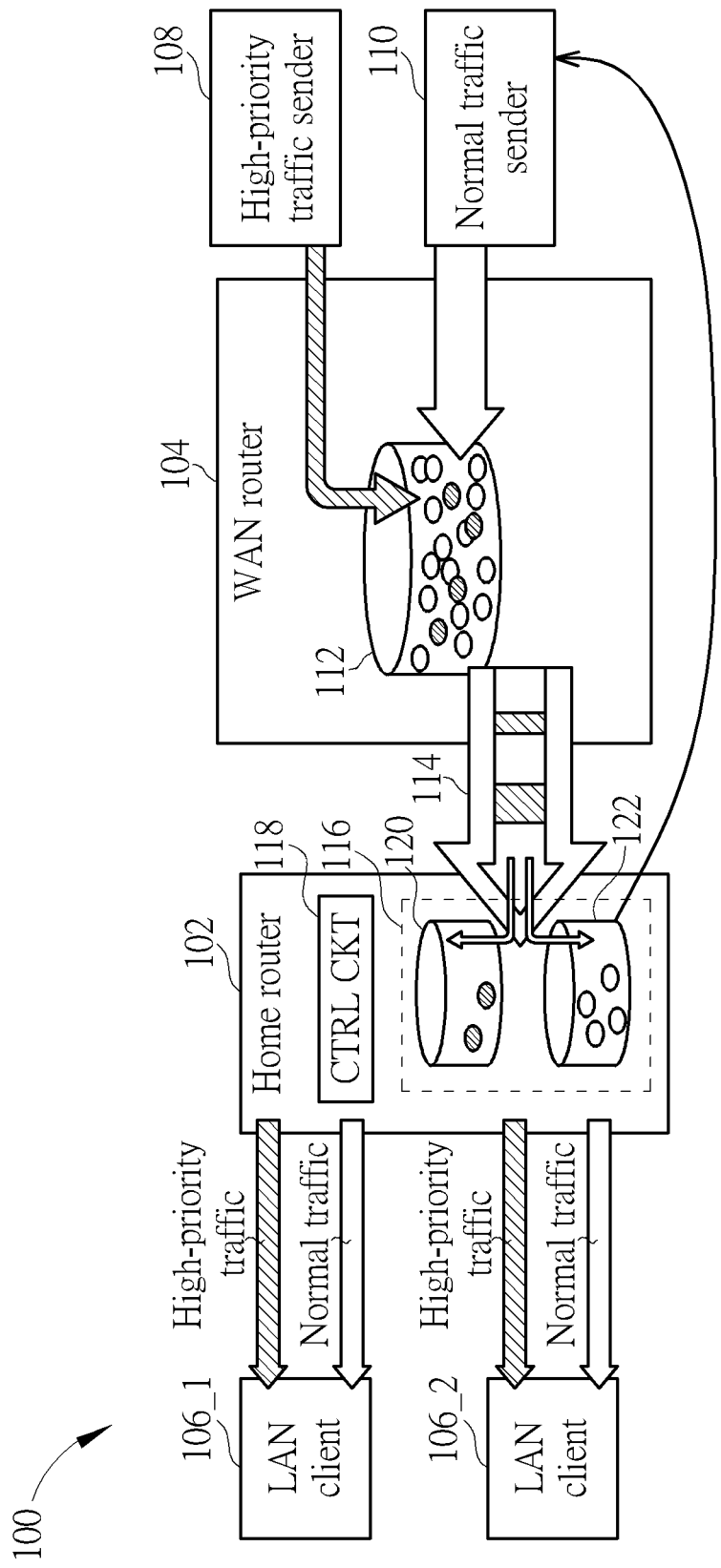
FIG. 1 is a diagram illustrating a network system according to an embodiment of the present invention.

FIG. 1 is a diagram illustrating a network system according to an embodiment of the present invention. The network system 100 has a plurality of network devices, including a home router 102, a wide area network (WAN) router 104, a plurality of local area network (LAN) clients 106_1, 106_2, a high-priority traffic sender 108, and a normal traffic sender 110. It should be noted that the number of clients (e.g. LAN clients 106_1 and 106_2) coupled to the home router 102 and the number of servers (e.g. high-priority traffic sender 108 and normal traffic sender 110) coupled to the WAN router (e.g. 5G core router) 104 may be adjusted, depending upon actual design considerations. The WAN router 104 has one queue 112 allocated in a memory (not shown). The queue 112 is shared for buffering packets of high-priority traffic (e.g. low-delay traffic) sent from the high-priority traffic sender 108 and packets of normal traffic (e.g. background bulk traffic) sent from the normal traffic sender 110. By way of example, but not limitation, the high-priority traffic may be game traffic or streaming traffic that requires low loss and low delay.

A downlink channel 114 with a limited downlink bandwidth is established between the WAN router 104 and the home router 102. Hence, the WAN router 104 can forward the high-priority traffic and/or the normal traffic sent from source devices (e.g. high-priority traffic sender 108 and/or normal traffic sender 110) to the home router 104 through the downlink channel 114. After receiving the downlink traffic (which may include the high-priority traffic and/or the normal traffic) from the WAN router 104, the home router 102 can forward packets derived from the received downlink traffic to destination devices (e.g. LAN client 106_1 and/or LAN client 106_2). Since the present invention is focused on controlling the downlink bandwidth between the WAN router 104 and the home router 102 and a person skilled in the art should readily understand details of forwarding packets from source devices (e.g. high-priority traffic sender 108 and/or normal traffic sender 110) to destination devices (e.g. LAN clients 106_1 and/or 106_2), further description of the packet forwarding operation is omitted here for brevity.

In this embodiment, the home router 102 employs the proposed downlink bandwidth control method for controlling a download speed of normal traffic in the presence of high-priority traffic for effectively reducing the high-priority traffic latency. As shown in FIG. 1, the home router 102 includes a buffer device 116 and a downlink bandwidth control circuit (labeled by "CTRL CKT") 118. It should be noted that only the components pertinent to the present invention are illustrated in FIG. 1. In practice, the home router 102 may include additional components to achieve other designated functions.

The buffer device 116 may be allocated in a memory (not shown), and may include a plurality of queues (e.g. queues 120 and 122) used for buffering traffic data with different priority, respectively. For example, one queue 120 is dedicated to buffering packets of the high-priority traffic, and the other queue 122 is dedicated to buffering packets of the normal traffic. Since packets of the high-priority traffic and packets of the normal traffic are not stored in the same queue of the home router 102, the download speed of the high-priority traffic can be easily controlled by adjusting a queue length of the queue 120, and the download speed of the normal traffic can be easily controlled by adjusting a queue length of the queue 122.

Furthermore, since packets of the high-priority traffic and packets of the normal traffic are not stored in the same home router queue, the home router 102 can send packets of the high-priority traffic in the queue 120 with higher priority. In a case where the home router 102 has a bufferbloat issue due to smaller download speeds of the LAN clients 106_1, 106_2, the bufferbloat issue will not add delay to the high-priority traffic between LAN clients 106_1, 106_2 and the home router 102, and only has impact on the normal traffic between LAN clients 106_1, 106_2 and the home router 102.

Figure 2:
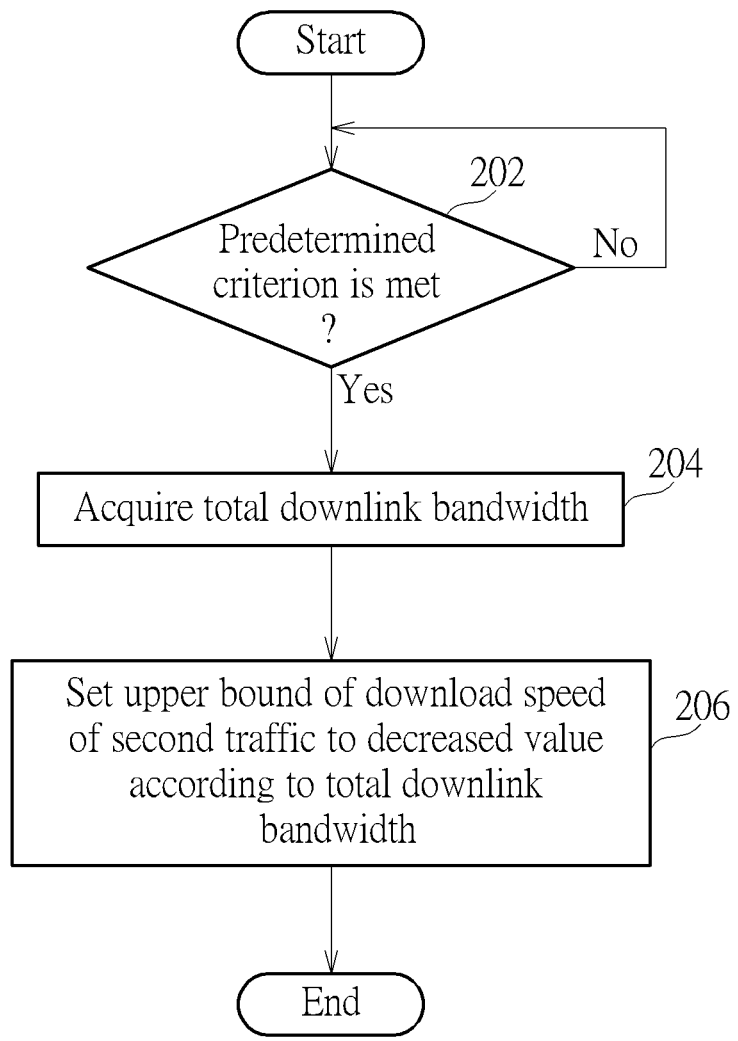
FIG. 2 is a flowchart illustrating a first downlink bandwidth control method according to an embodiment of the present invention.

The proposed downlink bandwidth control method is capable of solving the bufferbloat problem at the WAN router 104 and reducing the router queueing delay (packet processing time) caused by the WAN router 104. The downlink bandwidth control circuit 118 is arranged to deal with the proposed downlink bandwidth control method for controlling a download speed of normal traffic in the presence of high-priority traffic for effectively reducing the high-priority traffic latency. FIG. 2 is a flowchart illustrating a first downlink bandwidth control method according to an embodiment of the present invention. Provided that the result is substantially the same, the steps are not required to be executed in the exact order shown in FIG. 2. The downlink bandwidth control method is applicable to a network device. In the following, it is assumed that the downlink bandwidth control method may be employed by the home router 102. Specifically, steps of the downlink bandwidth control method may be performed (or controlled) by the downlink bandwidth control circuit 118. In addition, the first traffic may be the high-priority traffic sent from the high-priority traffic sender 108, and the second traffic may be the normal traffic sent from the normal traffic sender 110. That is, the terms "first traffic" and "high-priority traffic" may be interchangeable, and the terms "second traffic" and "normal traffic" may be interchangeable.

In one exemplary design, the downlink bandwidth control circuit 118 may be implemented by a general-purpose processor. Hence, after program codes are loaded and executed by the downlink bandwidth control circuit 118, the program codes instruct the downlink bandwidth control circuit 118 to perform steps of the downlink bandwidth control method. That is, the downlink bandwidth control method can be performed in a software-based manner.

In another exemplary design, the downlink bandwidth control circuit 118 may be implemented by dedicated hardware. Hence, the downlink bandwidth control circuit 118 uses pure hardware to perform steps of the downlink bandwidth control method. That is, the downlink bandwidth control method can be performed in a hardware-based manner.

Figure 3:
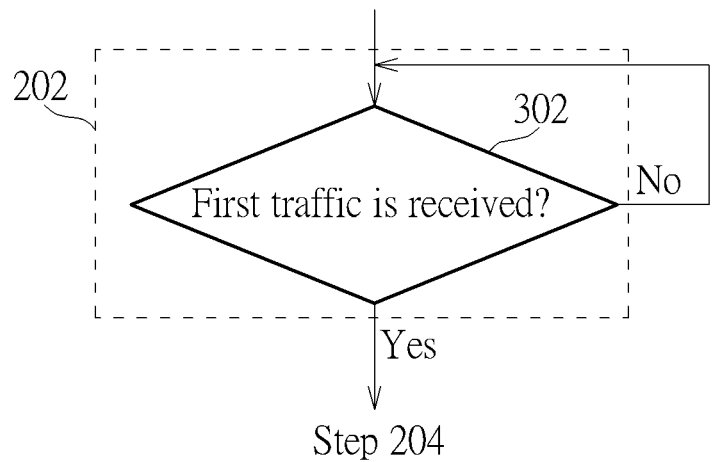
FIG. 3 is a diagram illustrating a first design of step 202 shown in FIG. 2 according to an embodiment of the present invention.

At step 202, the downlink bandwidth control circuit 118 determines whether traffic the network device (e.g. home router 102) is receiving meets a predetermined criterion associated with first traffic (e.g. high-priority traffic sent from the high-priority traffic sender 108). FIG. 3 is a diagram illustrating a first design of step 202 shown in FIG. 2 according to an embodiment of the present invention. The step 202 may include one sub-step 302. At sub-step 302, the downlink bandwidth control circuit 118 determines whether the traffic the network device (e.g. home router 102) is receiving includes the first traffic (e.g. high-priority traffic), to determine whether traffic the network device is receiving meets the predetermined criterion associated with first traffic. When the traffic the network device (e.g. home router 102) is receiving includes the first traffic, the predetermined criterion associated with first traffic is met, and the flow proceeds with step 204. When the traffic the network device is receiving does not include the first traffic, the predetermined criterion associated with first traffic is not met, and the flow keeps monitoring the traffic the network device is receiving.

Figure 4:
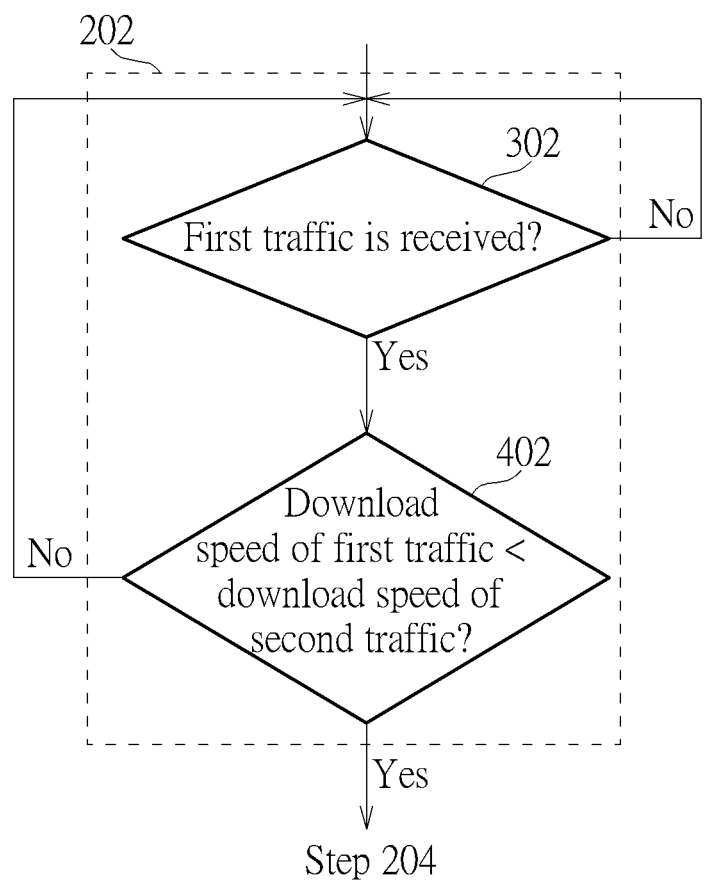
FIG. 4 is a diagram illustrating a second design of step 202 shown in FIG. 2 according to an embodiment of the present invention.

In some embodiments, additional condition(s) may be checked to determine whether traffic the network device is receiving meets the predetermined criterion associated with first traffic. FIG. 4 is a diagram illustrating a second design of step 202 shown in FIG. 2 according to an embodiment of the present invention. The step 202 may include two sub-steps 302 and 402. At sub-step 302, the downlink bandwidth control circuit 118 determines whether the traffic the network device (e.g. home router 102) is receiving includes the first traffic (e.g. high-priority traffic sent from the high-priority traffic sender 108). When the traffic the network device is receiving does not include the first traffic, the predetermined criterion associated with first traffic is not met, and the flow keeps monitoring the traffic the network device is receiving. When the traffic the network device is receiving includes the first traffic, the flow proceeds with sub-step 402. At sub-step 402, the downlink bandwidth control circuit 118 determines whether a download speed of the first traffic received by the network device is lower than a download speed of the second traffic (e.g., normal traffic sent from the normal traffic sender 110 and received by the network device). When the download speed of the first traffic is not lower than the download speed of the second traffic, it implies that the bufferbloat problem encountered by the WAN router 104 has less impact on the high-priority traffic, and router queueing delay (packet processing time) caused by the normal traffic does not significantly increase the latency of the high-priority traffic. Hence, when the download speed of the first traffic is not lower than the download speed of the second traffic, the predetermined criterion associated with first traffic is not met, and the flow returns to sub-step 302 to keep monitoring the traffic the network device is receiving. When the download speed of the first traffic is lower than the download speed of the second traffic, the predetermined criterion associated with first traffic is met, and the flow proceeds with step 204.

Figure 5:
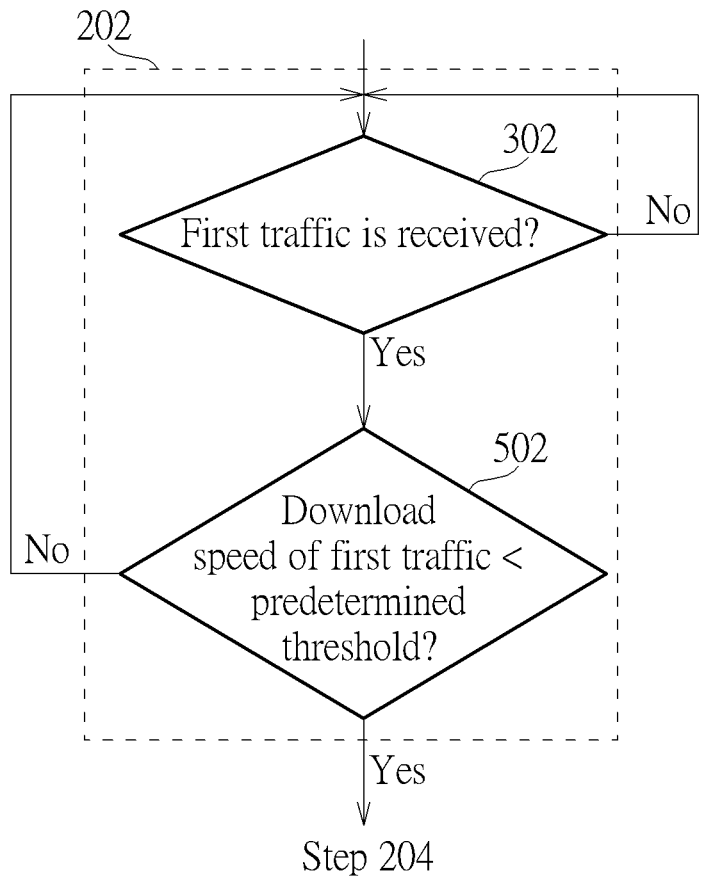
FIG. 5 is a diagram illustrating a third design of step 202 shown in FIG. 2 according to an embodiment of the present invention.

FIG. 5 is a diagram illustrating a third design of step 202 shown in FIG. 2 according to an embodiment of the present invention. The step 202 may include two sub-steps 302 and 502. At sub-step 302, the downlink bandwidth control circuit 118 determines whether the traffic the network device (e.g. home router 102) is receiving includes the first traffic (e.g. high-priority traffic sent from the high-priority traffic sender 108). When the traffic the network device is receiving does not include the first traffic, the predetermined criterion associated with first traffic is not met, and the flow keeps monitoring the traffic the network device is receiving. When the traffic the network device is receiving includes the first traffic, the flow proceeds with sub-step 502. At sub-step 502, the downlink bandwidth control circuit 118 determines whether a download speed of the first traffic received by the network device is lower than a predetermined threshold. When the download speed of the first traffic is not lower than the predetermined threshold, it implies that the bufferbloat problem encountered by the WAN router 104 has less impact on the high-priority traffic, and router queueing delay (packet processing time) caused by the normal traffic does not significantly increase the latency of the high-priority traffic. Hence, when the download speed of the first traffic is not lower than the predetermined threshold, the predetermined criterion associated with first traffic is not met, and the flow returns to sub-step 302 to keep monitoring the traffic the network device is receiving. When the download speed of the first traffic is lower than the predetermined threshold, the predetermined criterion associated with first traffic is met, and the flow proceeds with step 204.

At step 204, the downlink bandwidth control circuit 118 acquires a total downlink bandwidth between the network device (e.g. home router 102) and another network device (e.g. WAN router 104). For example, the total downlink bandwidth may be acquired via a user input that specifies a maximum downlink bandwidth provided by the WAN router 104. For another example, the total downlink bandwidth may be acquired via online measurement. In some embodiments, a bandwidth measurement application may be executed for measuring the actual downlink bandwidth between the network device (e.g. home router 102) and another network device (e.g. WAN router 104), and provides the downlink bandwidth measurement result to the downlink bandwidth control circuit 118. These are for illustrative purposes only, and are not meant to be limitations of the present invention. In practice, any means capable of providing information indicative of the total downlink bandwidth between the network device (e.g. home router 102) and another network device (e.g. WAN router 104) can be adopted.

After the downlink bandwidth control circuit 118 acquires the total downlink bandwidth, the flow proceeds with step 206. At step 206, the downlink bandwidth control circuit 118 sets an upper bound of the download speed of the second traffic (e.g. normal traffic sent from the normal traffic sender 110 and received by the home router 102) to a decreased value according to the total downlink bandwidth acquired at step 204. In this embodiment, the decreased value is equal to a portion of the total downlink bandwidth. That is, the upper bound of the download speed of the second traffic is set on the basis of the total downlink bandwidth between the network device (e.g. home router 102) and another network device (e.g. WAN router 104), and is decreased in response to determining that the traffic the network device is receiving meets the predetermined criterion associated with the first traffic (e.g. high-priority traffic received by the home router 102). For example, the downlink bandwidth control circuit 118 may set the upper bound of the download speed of the second traffic through setting a queue size of the queue 122 that is dedicated to buffering packets of the second traffic.

When the upper bound of the download speed of the normal traffic between the home router 102 and the WAN router 104 is actively decreased at the home router 104, the download speed of the normal traffic between the normal traffic sender 110 and the WAN router 104 will be forced to decrease due to inherent characteristics of the protocol such as the transmission control protocol (TCP). Specifically, adjusting the upper bound of the download speed of the normal traffic between the home router 102 and the WAN router 104 is equivalent to adjusting the upper bound of the download speed of the normal traffic between the normal traffic sender 110 and the WAN router 104. Ideally, the download speed of the normal traffic between the normal traffic sender 110 and the WAN router 104 will be equal to the download speed of the normal traffic between the home router 102 and the WAN router 104. Since the download speed of the normal traffic between the normal traffic sender 110 and the WAN router 104 is decreased, the WAN router 104 can be free from the bufferbloat issue, and the router queueing delay (packet processing time) caused by the normal traffic can be decreased for effectively reducing the delay added to the high-priority traffic at the WAN router 104.

In some embodiments, the downlink bandwidth control method may include additional step(s) for ensuring that downlink transmission of the high-priority traffic is not downgraded and/or the bandwidth usage of the downlink channel is decreased, under a condition that the upper bound of the download speed of the normal traffic between the home router 102 and the WAN router 104 is actively decreased by the home router 102.

Figure 6:
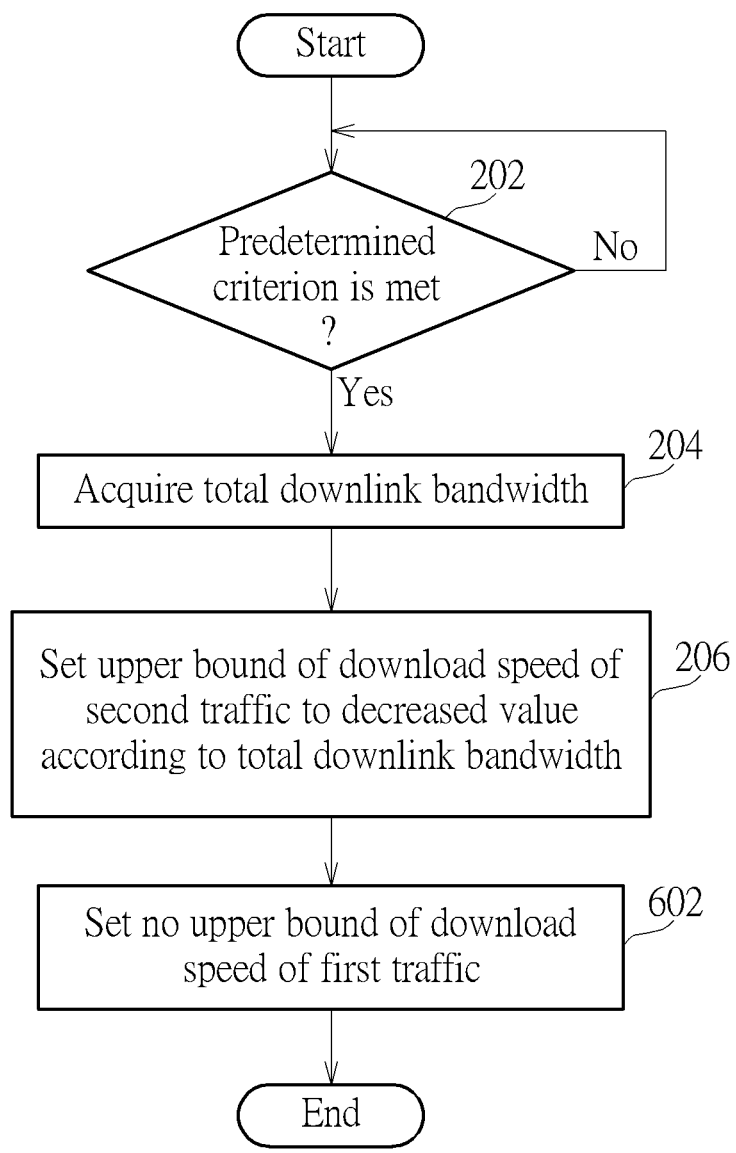
FIG. 6 is a flowchart illustrating a second downlink bandwidth control method according to an embodiment of the present invention.

FIG. 6 is a flowchart illustrating a second downlink bandwidth control method according to an embodiment of the present invention. Provided that the result is substantially the same, the steps are not required to be executed in the exact order shown in FIG. 6. The downlink bandwidth control method shown in FIG. 6 may be employed by the home router 102. Specifically, steps of the downlink bandwidth control method may be performed (or controlled) by the downlink bandwidth control circuit 118 in a hardware-based manner or a software-based manner. The major difference between the downlink bandwidth control methods shown in FIG. 6 and FIG. 2 is that the downlink bandwidth control method in FIG. 6 includes an additional step 602. At step 602, the downlink bandwidth control circuit 118 sets no upper bound of the download speed of the first traffic (e.g. high-priority traffic sent from the high-priority traffic sender 108). Since the home router 102 has no upper bound of the download speed of the high-priority traffic, the bandwidth usage of the downlink channel 114 regarding the high-priority traffic is not decreased, which ensures that the downlink transmission of the high-priority traffic is not downgraded.

Figure 7:
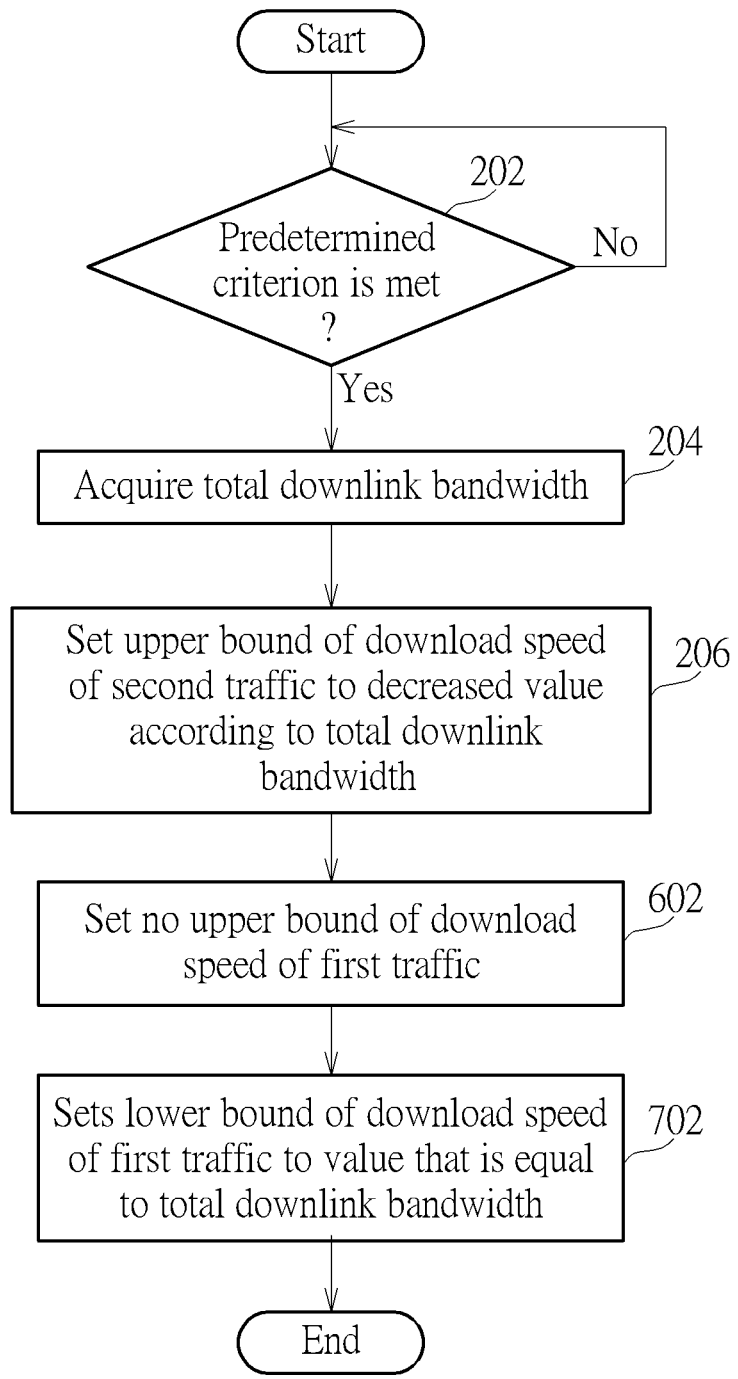
FIG. 7 is a flowchart illustrating a third downlink bandwidth control method according to an embodiment of the present invention.

FIG. 7 is a flowchart illustrating a third downlink bandwidth control method according to an embodiment of the present invention. Provided that the result is substantially the same, the steps are not required to be executed in the exact order shown in FIG. 7. The downlink bandwidth control method shown in FIG. 7 may be employed by the home router 102. Specifically, steps of the downlink bandwidth control method may be performed (or controlled) by the downlink bandwidth control circuit 118 in a hardware-based manner or a software-based manner. The major difference between the downlink bandwidth control methods shown in FIG. 7 and FIG. 6 is that the downlink bandwidth control method in FIG. 7 includes an additional step 702. At step 702, the downlink bandwidth control circuit 118 sets a lower bound of the download speed of the first traffic (e.g. high-priority traffic sent from the high-priority traffic sender 108 and received by the home router 102) to a value that is equal to the total downlink bandwidth acquired at step 204, which means that the first traffic is allowed to use up to the total downlink bandwidth. Since the bandwidth usage of the downlink channel 114 regarding the high-priority traffic is not decreased, the downlink transmission of the high-priority traffic is not downgraded. It should be noted that, in some embodiments, step 602 in FIG. 7 may be omitted.

Figure 8:
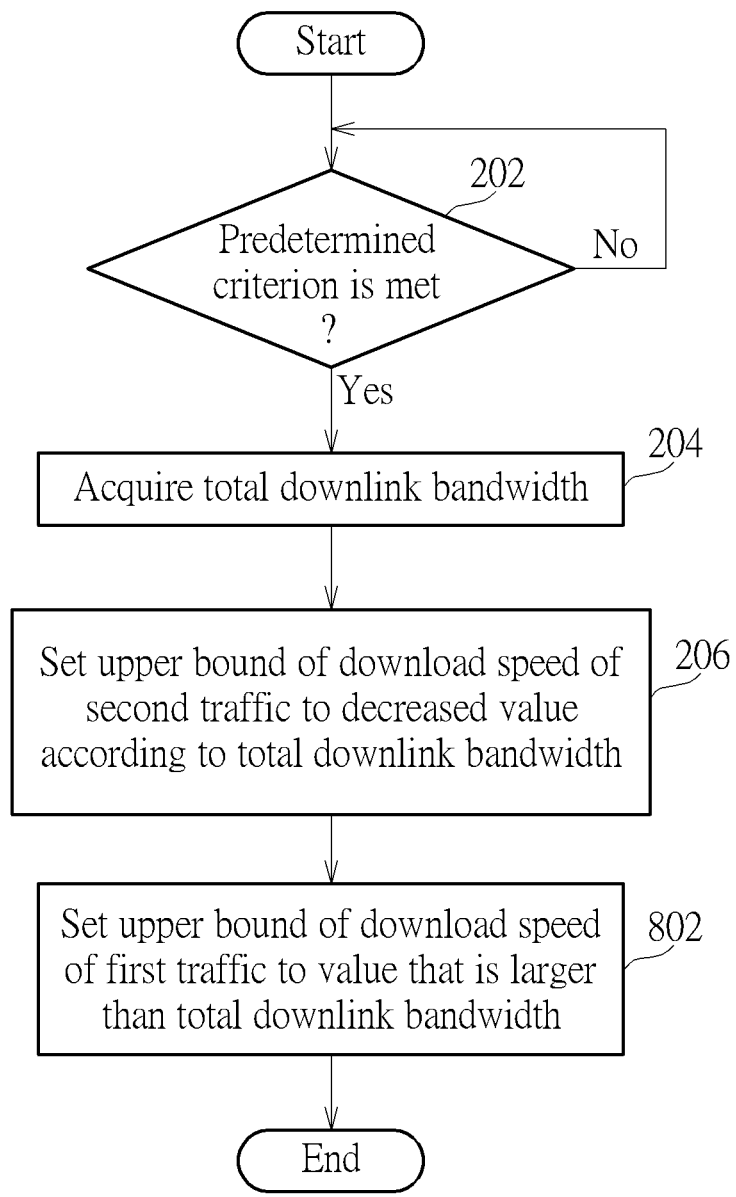
FIG. 8 is a flowchart illustrating a fourth downlink bandwidth control method according to an embodiment of the present invention.

FIG. 8 is a flowchart illustrating a fourth downlink bandwidth control method according to an embodiment of the present invention. Provided that the result is substantially the same, the steps are not required to be executed in the exact order shown in FIG. 8. The downlink bandwidth control method shown in FIG. 8 may be employed by the home router 102. Specifically, steps of the downlink bandwidth control method may be performed (or controlled) by the downlink bandwidth control circuit 118 in a hardware-based manner or a software-based manner. The major difference between the downlink bandwidth control methods shown in FIG. 8 and FIG. 2 is that the downlink bandwidth control method in FIG. 8 includes an additional step 802. At step 802, the downlink bandwidth control circuit 118 sets an upper bound of the download speed of the first traffic (e.g. high-priority traffic sent from the high-priority traffic sender 108 and received by the home router 102) to a value that is larger than the total downlink bandwidth acquired at step 204. Since the bandwidth usage of the downlink channel 114 regarding the high-priority traffic is not decreased, the downlink transmission of the high-priority traffic is not downgraded.

Figure 9:
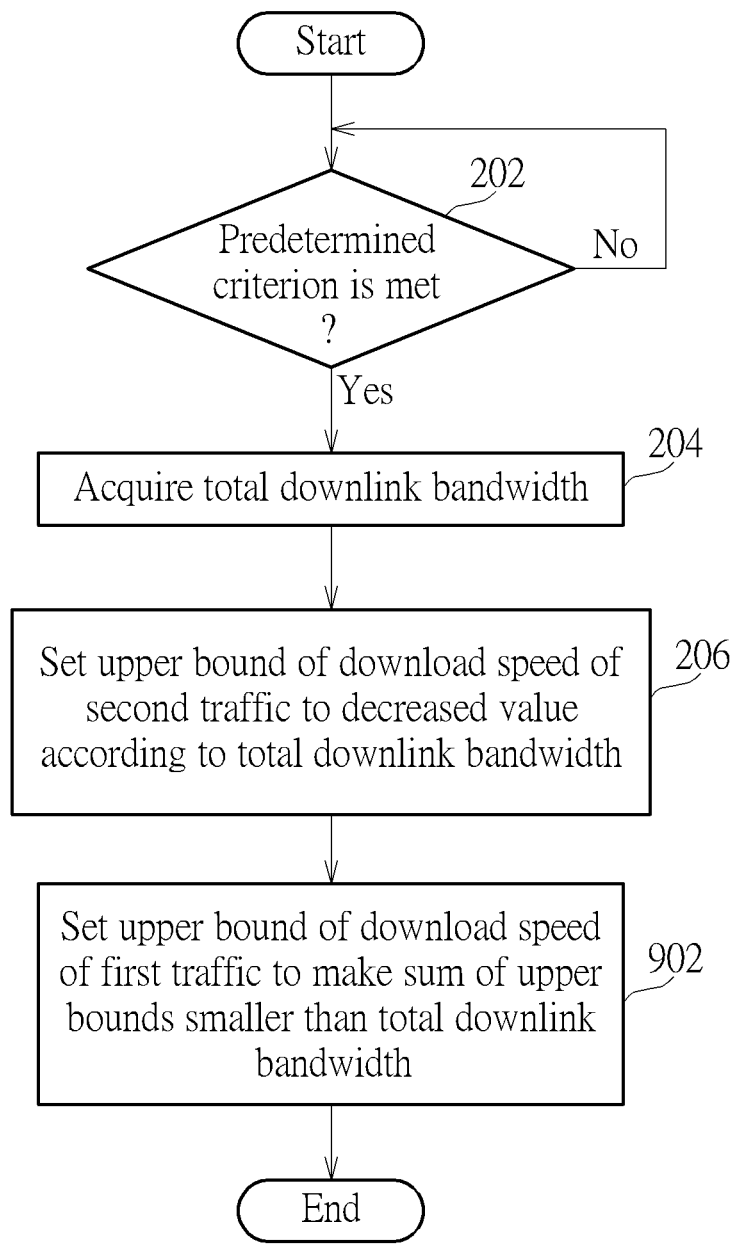
FIG. 9 is a flowchart illustrating a fifth downlink bandwidth control method according to an embodiment of the present invention.

FIG. 9 is a flowchart illustrating a fifth downlink bandwidth control method according to an embodiment of the present invention. Provided that the result is substantially the same, the steps are not required to be executed in the exact order shown in FIG. 9. The downlink bandwidth control method shown in FIG. 9 may be employed by the home router 102. Specifically, steps of the downlink bandwidth control method may be performed (or controlled) by the downlink bandwidth control circuit 118 in a hardware-based manner or a software-based manner. The major difference between the downlink bandwidth control methods shown in FIG. 9 and FIG. 2 is that the downlink bandwidth control method in FIG. 9 includes an additional step 902. At step 902, the downlink bandwidth control circuit 118 sets an upper bound of the download speed of the first traffic (e.g. high-priority traffic sent from the high-priority traffic sender 108 and received by the home router 102), to make a sum of the upper bound of the download speed of the first traffic and the upper bound of the download speed of the second traffic (e.g. normal traffic sent from the normal traffic sender 110 and received by the home router 102) smaller than the total downlink bandwidth acquired at step 204. Since the decreased bandwidth usage of the downlink channel 114 between the home router 102 and the WAN router 104 is ensured by upper bound settings of download speed of normal traffic and download speed of high-priority traffic, decreased router queueing delay (packet processing time) caused by the WAN router 104 is ensured, which reduces the delay added to the high-priority traffic at the WAN router 104.

In above embodiments, the proposed downlink bandwidth control method is employed by the home router 102. However, this is for illustrative purposes only, and is not meant to be a limitation of the present invention. In practice, any network device using the proposed downlink bandwidth control method for controlling a download speed of normal traffic in the presence of high-priority traffic falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A downlink bandwidth control method applicable to a network device including a first queue for first traffic and a second queue for second traffic, comprising:
   determining whether traffic the network device is receiving meets a predetermined criterion associated with the first traffic;
   acquiring a total downlink bandwidth between the network device and another network device; and
   in response to determining that the traffic the network device is receiving meets the predetermined criterion associated with the first traffic, setting an upper bound of a download speed of the second traffic to a decreased value according to the total downlink bandwidth, wherein the decreased value is equal to a portion of the total downlink bandwidth; and setting the upper bound of the download speed of the second traffic to the decreased value is not performed unless the predetermined criterion associated with the first traffic is met.

2. The downlink bandwidth control method of claim 1, wherein determining whether the traffic the network device is receiving meets the predetermined criterion associated with the first traffic comprises:
determining whether the traffic the network device is receiving includes the first traffic.

3. The downlink bandwidth control method of claim 2, wherein determining whether the traffic the network device is receiving meets the predetermined criterion associated with the first traffic further comprises:
determining whether a download speed of the first traffic is lower than the download speed of the second traffic.

4. The downlink bandwidth control method of claim 2, wherein determining whether the traffic the network device is receiving meets the predetermined criterion associated with the first traffic further comprises:
determining whether a download speed of the first traffic is lower than a predetermined threshold.

5. The downlink bandwidth control method of claim 1, further comprising:
in response to determining that the traffic the network device is receiving meets the predetermined criterion associated with the first traffic, setting no upper bound of a download speed of the first traffic.

6. The downlink bandwidth control method of claim 1, further comprising:
in response to determining that the traffic the network device is receiving meets the predetermined criterion associated with the first traffic, setting an upper bound of a download speed of the first traffic to a value that is larger than the total downlink bandwidth.

7. The downlink bandwidth control method of claim 1, further comprising:
in response to determining that the traffic the network device is receiving meets the predetermined criterion associated with the first traffic, setting an upper bound of a download speed of the first traffic, wherein a sum of the upper bound of the download speed of the first traffic and the upper bound of the download speed of the second traffic is smaller than the total downlink bandwidth.

8. The downlink bandwidth control method of claim 1, further comprising:
in response to determining that the traffic the network device is receiving meets the predetermined criterion associated with the first traffic, setting a lower bound of a download speed of the first traffic to a value that is equal to the total downlink bandwidth.

9. The downlink bandwidth control method of claim 1, wherein the first traffic has higher priority than the second traffic.

10. The downlink bandwidth control method of claim 1, wherein setting the upper bound of the download speed of the second traffic is achieved through setting a queue size of the second queue.

11. A network device comprising:
a first queue, arranged to buffer packets of first traffic;
a second queue, arranged to buffer packets of second traffic; and
a downlink bandwidth control circuit, arranged to:
determine whether traffic the network device is receiving meets a predetermined criterion associated with the first traffic;
acquire a total downlink bandwidth between the network device and another network device; and
when determining that the traffic the network device is receiving meets the predetermined criterion associated with the first traffic, set an upper bound of a download speed of the second traffic to a decreased value according to the total downlink bandwidth, wherein the decreased value is equal to a portion of the total downlink bandwidth; and the upper bound of the download speed of the second traffic is not set by the decreased value unless the predetermined criterion associated with the first traffic is met.

12. The network device of claim 11, wherein the downlink bandwidth control circuit determines whether the traffic the network device is receiving includes the first traffic, to determine whether the traffic the network device is receiving meets the predetermined criterion associated with the first traffic.

13. The network device of claim 12, wherein the downlink bandwidth control circuit further determines whether a download speed of the first traffic is lower than the download speed of the second traffic, to determine whether the traffic the network device is receiving meets the predetermined criterion associated with the first traffic.

14. The network device of claim 12, wherein the downlink bandwidth control circuit further determines whether a download speed of the first traffic is lower than a predetermined threshold, to determine whether the traffic the network device is receiving meets the predetermined criterion associated with the first traffic.

15. The network device of claim 11, wherein when determining that the traffic the network device is receiving meets the predetermined criterion associated with the first traffic, the downlink bandwidth control circuit is further arranged to set no upper bound of a download speed of the first traffic.

16. The network device of claim 11, wherein when determining that the traffic the network device is receiving meets the predetermined criterion associated with the first traffic, the downlink bandwidth control circuit is further arranged to set an upper bound of a download speed of the first traffic to a value that is larger than the total downlink bandwidth.

17. The network device of claim 11, wherein when determining that the traffic the network device is receiving meets the predetermined criterion associated with the first traffic, the downlink bandwidth control circuit is further arranged to set an upper bound of a download speed of the first traffic, where a sum of the upper bound of the download speed of the first traffic and the upper bound of the download speed of the second traffic is smaller than the total downlink bandwidth.

18. The network device of claim 11, wherein when determining that the traffic the network device is receiving meets the predetermined criterion associated with the first traffic, the downlink bandwidth control circuit is further arranged to set a lower bound of a download speed of the first traffic to a value that is equal to the total downlink bandwidth.

19. The network device of claim 11, wherein the first traffic has higher priority than the second traffic.

20. The network device of claim 11, wherein the downlink bandwidth control circuit sets the upper bound of the download speed of the second traffic through setting a queue size of the second queue.

* * * * *